Patented July 27, 1943

2,325,297

UNITED STATES PATENT OFFICE 2,325,297

PRINTING INK

Floyd E. Barmeier, Chicago, Ill., assignor to General Printing Ink Corporation, New York, N. Y., a corporation of Delaware No Drawing. Application August 1, 1940, Serial No. 349,304

6 Claims. (Cl. 106—30)

This invention relates to printing inks, and more particularly to inks adapted to be printed at high speeds, and dried by the application of heat.

Prior to the recent development of relatively high speed printing processes, the majority of printing inks comprised varnish bases blended of drying oils and resins, to which pigments and other ingredients were added, and these inks relied for the fluidity upon the presence of the drying oil. With the demand for higher speeds, oils were abandoned to a great extent, and liquid solvents were substituted to produce the necessary ink fluidity. In the operation of these inks heretofore it was observed that practically all inks of this type attacked the printing press rollers, causing them to swell and eventually to disintegrate.

The printing press rollers ordinarily used on a letter type press are composed either of rubber, or of any of the so-called synthetic rubbers such as neoprene, thiokol and the like, or mixtures or modifications of these materials. All seem to be similarly affected by said solvent type inks and various expedients were adopted to compensate for or alleviate this operating condition for which no remedy was found and which was generally considered to be a difficulty that was irremediable. Since the liquids which were good solvents for the known and suitable resin vehicles were also solvents for the resinous rubber and synthetic rubber of the rollers used, the natural conclusion accorded with the fact that the solvents selected would have an adverse effect on the rollers of this type.

The damage to the rollers appeared to be due to a selective absorption of the solvent by the rollers, which resulted in a swelling of the rollers and their eventual deterioration. All ink contacting rollers were affected including the distribution rollers and the form rollers. The change in the diameters of the rollers thus occasioned, made necessary the constant readjustment of the mechanism to keep the degree of contact proper for optimum distribution and printing. The swelling was most serious as it affected the form roller. This is the roller which transfers the ink to the printing plate. It is adjusted with minute accuracy to contact the plate with exactly the degree of pressure required to transfer enough ink to the raised characters of the plate without squeezing it off the high spots. Any swelling of the roller without compensating adjustment causes a heavier contact, which results in forcing the ink from the high areas where it belongs to the depressed areas which should be free of ink. Furthermore, the selective absorption of the solvent by the rollers, robbed the ink of its required fluidity, and caused the transfer of a very heavy, tacky ink to the printing plate which tended to "pick" the paper and tear it apart.

The solvents customarily used in the heat drying type of inks, have been selected almost universally from the petroleum group. Petroleum solvents vary widely, however, in many of their characteristics depending on the locality in which they originate, in the manner of distillation, and in the fraction selected. I have found that resin dissolving power of such fractions varies widely depending on the base oil from which it is obtained, and its mode of preparation. For example, fraction from West Coast petroleums have the highest dissolving power, those from Pennsylvania oils the lowest, while those from the Mid-Continent field lie between these extremes. By means of the socalled kauri-butanol test, which has been used in some branches of the chemical industry, I have determined, as illustrative, that by comparison the West Coast oils have a range from 85 to 100, the Pennsylvania oils as low as about 35, and the Mid-Continent oils in the neighborhood of 50 to 60. In around 150 available petroleum solvents listed by Gardner in his book entitled "Physical and Chemical Examination of Paints, Varnishes, Lacquers and Colors," 9th edition, on pages 570–572, nearly every degree between 31 and 100 is represented. All such solvents in this range affect the rollers deleteriously, some more than others, and since all had this same adverse effect, no one seems to have appreciated how suitably effective solvents might be secured which would be free from the objectional effects on the rollers.

It is therefore a primary object of this invention to produce an ink of this character which will avoid the difficulties caused by objectionable roller swelling, and further to provide an ink whose solvent component is so limited as to solvent power as to be below the solvent capacity for the particular roller used, although the particular resinous roller surface has an inherent capacity of selective absorption of solvents. It is a further object to provide inks of this character which in addition are stable at room temperatures and at temperatures of high speed printing press operations, and which moreover will dry rapidly after printing by the application of heat.

I have now found that if I select a solvent so as to have all the desired solubility characteristics for a suitable "heat dry" ink, and so that in addition it has an extraordinarily low kauri-butanol value, within definite limitations, practically no deleterious swelling or disintegration of the rollers is apparent over relatively long periods of use.

As set forth in the copending application of Joseph G. Curado, Serial No. 346,801, filed July 22, 1940, a solvent system has been evolved which yields inks of the highest qualities in performance and results, which can utilize extremely small amounts of good solvent material. This solvent system utilizes a Pennsylvania base oil so prepared as to have a plurality of components which admixed in a composite have a solvent power effective with respect to the rollers appreciably below that usually obtained in petroleum oils from any previous source, and which, by its particular mode of preparation, is obtained with such a solvent power, as illustrated by the kauri-butanol test, hereinafter described, below a value of 30.

Other satisfactory solvents may be prepared by utilizing pure aliphatic compounds of the appropriate boiling ranges, and adding thereto sufficient small proportions—in the neighborhood of 10%—of olefinic or aromatic compounds, having substantially the same or slightly lower boiling ranges than the aliphatic material, to bring the solvent power, as illustrated by the kauri-butanol test, to a value between 20 and 30.

The kauri-butanol test is a standard test adopted in certain branches of the chemical industry to evaluate the solvent power characteristics of various petroleum thinners. The test is described by Gardner in the book previously referred to, on page 315, as follows:

"One hundred grams of carefully selected pulverized kauri gum is dissolved in 500 grams of butyl alcohol 114.4° C. (238° F.)–116.6° C. (242° F.) and heated to the boiling point of the liquid until the kauri is all dissolved. After the flask has been cooled, additional butyl alcohol is added until the ratio of 100 grams of kauri to 500 grams of butyl alcohol is reestablished. The mixture is allowed to stand for 96 hours in a well stoppered bottle when the supernatent liquid is decanted into a clean, dry bottle.

Twenty grams of this mixture are weighed into a flat bottom flask. This is placed on white paper carrying fine black printing and the volatile solvent to be tested is titrated into it, keeping the material at exactly 77° F. and continuing the addition until the point is reached where the printing is blurred. The number of cc.'s required denotes its solvent properties."

Toluol is taken as the standard, and has a value of 105, which means that 105 cubic centimeters of toluol can be added to 20 grams of the solution above described before the gum will begin to precipitate. In general, a high value is desirable, as the higher values denote higher solvency. Petroleum solvents have lower values than toluol and benzol, and in general range between about 30 and 95. That used in heat dry printing inks heretofore, has also varied almost as widely, no significance having been attached to the kauri-butanol value, except to try to get one high enough to afford good resin solubility.

The higher the value, the greater the solvent power for the resin vehicles used in making the paint or ink. However, this same solvent power renders such materials, when used as ink solvents, capable of attacking and swelling the natural and synthetic rubber rollers used, with the resulting difficulties enumerated above.

I have now found that if I select a solvent having the extremely low kauri-butanol value of in the neighborhood of 20 to 30, no deleterious swelling of the printing rollers occurs. This is a most surprising discovery, particularly in view of the fact that the ordinary solvent power of these solvents is so low that it would not be predictable that a suitable ink could be made from such solvents, and in fact, no solvents of such low values are even listed in Gardner's book, as they were apparently not considered as of any interest whatsoever from the coating composition standpoint. The solvency of kauri gum in any particular solvent, is paralleled by the solvency of other resinous materials in the same solvent. The aim of the ink maker has therefore been to use a solvent with a high kauri-butanol value as indicative of a more highly satifactory solvent power for his resinous vehicles.

The solvents which I prefer to use are petroleum fractions having suitably high boiling points to meet the "air stability" requirements of the heat dry presses, namely between about 250° C. and 320° C., and having kauri-butanol values between 20 and 30. Values lower than 20, have proved to have insufficient dissolving power to produce a satisfactory working ink, while those with a value above 30 begin to show signs of deleteriously attacking the rollers.

To illustrate the action of various solvents on resinous materials such as natural and synthetic rubber surfaced printing press rollers, tests were run in which portions of the roller surfacing materials were immersed in the solvents under test for 48 hours. The percentage gain in weight during that time is given in Table I below, and indicates the degree to which the several materials were attacked. It will be observed that in the case of the natural rubber material, there is a critical drop in the attack on the rollers when the kauri-butanol value drops from 26 to 24, the percentage absorption dropping from around 12 to approximately 6%. Hence, if rollers surfaced with natural rubber compositions are to be used, objectionably deleterious absorption of solvent into the roller surfacing material can be avoided if the kauri-butanol value is kept below about 25. In the case of the so-called synthetic rubber or neoprene-vulcanized oil material, this critical decrease in roller composition attack occurs at a value between 38 and 28, and other tests show the critical drop to lie in the neighborhood of about 30, corresponding to an absorption of around 5 or 6%. Accordingly, when printing press rollers of this neoprene type are to be used, the kauri-butanol value of the solvent used should not exceed about 30, but can well be as high as 20 or more, as a percentage absorption of around 4 or 5% which occurs within these limits is actually negligible under conditions of use of the rollers, whereas 15% or more as illustrated by the 38 kauri-butanol value material is objectionably troublesome, and with some commercial inks of the type above referred to, some solvents have been used giving absorption values as great as 31% in 48 hours.

TABLE I

*Per cent gain in weight of roller compositions after 48 hrs. immersion*

| Solvent number | Kauri-butanol number | Rubber | Neoprene 50 oil [1] | Neoprene 100 oil [1] | Neoprene 150 oil [1] |
|---|---|---|---|---|---|
| 1 | 54 | 31.8 | 26.9 | 25 | 20.48 |
| 2 | 38 | 20.8 | 15.4 | 14.2 | 12.1 |
| 3 | 28 | 11.72 | 4.77 | 4.70 | 3.4 |
| 4 | 26 | 12.7 | 3.27 | 3.61 | 3.04 |
| 5 | 26 | 12.25 | 3.25 | 4.25 | 2.39 |
| 6 | 24 | 6.0 | .99 | 1.88 | 2.03 |
| 7 | 22 | 5.63 | 1.12 | 1.63 | 1.76 |

[1] Percentage vulcanized oil to neoprene.

Satisfactory heat dry inks according to my invention can be made as follows:

Black:
    *Percent by weight*
  Resin _____ 40
  Petroleum K. B. value 26_____ 40
  Carbon black_____ 20
                                           100.0

*Yellow*
  Resin _____ 30
  Petroleum K. B. value 22_____ 30
  Chrome yellow _____ 40
                                           100.0

Any of the commonly used natural and/or synthetic resins are suitable, including the phenylated copals, limed rosin, zincated rosin, ester gum, oil modified and rosin extended alkyds, phenol resins, cumarone and indene type resins, and in fact any which exhibit the suitable solubility in the low kauri-butanol value solvents above described, together with the necessary working qualities required in an ink of this type.

The resin and solvent are first blended by introducing the required quantity of resin into the heated solvent and agitating until the mass is homogeneous. Pigment is then introduced gradually, while maintaining the agitation until thoroughly mixed, when it is ground to the final degree of fine dispersion on a suitable ink mill such as a three roller mill.

Other materials may be added in small amounts, as is customary in the preparation of inks of this type, and these materials include waxes, plasticizers, dyes, toners, and other usual ink modifiers depending on the particular working characteristics desired for a particular kind of printing, or a particular type of press.

While the above sets forth a preferred embodiment for the practicing of my invention, it is to be understood that departures may be made therefrom within the scope of the invention as described and claimed.

What is claimed is:

1. For use on a printing press having rollers surfaced with a resinous material which has the capacity of selective absorption of petroleum solvents, an ink comprising a petroleum solvent selected as to solvent characteristics so as to have a kauri-butanol value between 20 and 30, whereby no deleterious absorption of the solvent by the roller surface occurs.

2. For use on a printing press having a roller surfaced with a resinous material which has the capacity of selective absorption of solvents such as used in resinous binder printing ink vehicles and of objectionably absorbing components of certain solvents used in said ink, an ink comprising a soluble resinous binder component, and a solvent of the petroleum type having selective solvent powers for said resinous binder component to give an ink of normal printing qualities and press stability, but which has such limited solvent capacity for the resinous material used in the press rollers that said solvent will have substantially unobjectionable penetrating effect into the roller surfacing material for extended periods of operation of the order of not less than about 48 hours, and said solvent being such as to have a kauri-butanol value within the range of about 20 to 30.

3. For use on a printing press having a roller surfaced with a resinous material which has the capacity of selective absorption of solvents such as used in resinous binder printing ink vehicles and of objectionably absorbing components of certain solvents used in said ink, an ink comprising a soluble resinous binder component, and a solvent of the petroleum type having selective solvent powers for said resinous binder component to give an ink of normal printing qualities and press stability, but which has such limited solvent capacity for the resinous material used in the press rollers that said solvent will have substantially unobjectionable penetrating effect into the roller surfacing material of the order of not more than about 6% in 48 hours, and said solvent being such as to have a kauri-butanol value within the range of about 20 to 30.

4. For use on a printing press having a roller surfaced with a resinous material which has the capacity of selective absorption of solvents such as used in resinous binder printing ink vehicles and of objectionably absorbing components of certain solvents used in said ink, an ink comprising a soluble resinous binder component selected from the group consisting of phenylated copals, limed rosin, zincated rosin, ester gum, oil modified and rosin extended alkyds, phenol resins, cumarone and indene type resins, and a solvent of the petroleum type having selective solvent powers for said resinous binder component to give an ink of normal printing qualities and press stability, but which has such limited solvent capacity for the resinous material used in the press rollers that said solvent will have substantially unobjectionable penetrating effect into the roller surfacing material for extended periods of operation of the order of not less than about 48 hours, and said solvent being such as to have a kauri-butanol value within the range of about 20 to 30.

5. For use on a printing press having a roller surfaced with a resinous material which has the capacity of selective absorption of solvents such as used in resinous binder printing ink vehicles and of objectionably absorbing components of certain solvents used in said ink, an ink comprising a soluble resinous binder component selected from the group consisting of phenylated copals, limed rosin, zincated rosin, ester gum, oil modified and rosin extended alkyds, phenol resins, cumarone and indene type resins, and a solvent of the petroleum type having selective solvent powers for said resinous binder component to give an ink of normal printing qualities and press stability, but which has such limited solvent capacity for the resinous material used in the press rollers that said solvent will have substantially unobjectionable penetrating effect into the roller surfacing material of the order of not more than about 6% in 48 hours, and said solvent being such as to have a kauributanol value within the range of about 20 to 30.

6. For use on a printing press having a roller surfaced with a resinous material which has the capacity of objectionably absorbing certain solvents such as used in resinous binder printing ink vehicles with resultant swelling of the surface of the roller, an ink comprising a resinous binder component, and a solvent of the petroleum type for said resinous binder component, said solvent being selected with reference to predetermined upper and lower limits of its kauributanol values, the lower of said limits being not less than the limiting value at which said resinous binder component and solvent will form an ink having satisfactory printing qualities and press stability, the upper of said limits being not greater than about thirty and such that said solvent does not objectionably affect and swell the surface of said roll when in contact therewith over extended periods of operation of the order of about forty-eight hours.

FLOYD E. BARMEIER.